(12) United States Patent
Sasso et al.

(10) Patent No.: US 7,830,880 B2
(45) Date of Patent: Nov. 9, 2010

(54) SELECTIVE BUILD FABRIC (BF) AND RECONFIGURE FABRIC (RCF) FLOODING

(75) Inventors: Christian Sasso, Milpitas, CA (US); Anand Hariharan, San Jose, CA (US); Ronak Desai, Fremont, CA (US); Siddharth Kasat, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 11/842,800

(22) Filed: Aug. 21, 2007

(65) Prior Publication Data

US 2009/0052474 A1 Feb. 26, 2009

(51) Int. Cl.
*H04J 3/06* (2006.01)

(52) U.S. Cl. .................. 370/390; 370/503; 398/154

(58) Field of Classification Search .......... None
See application file for complete search history.

(56) References Cited

U.S. PATENT DOCUMENTS

| | | | | |
|---|---|---|---|---|
| 4,965,788 | A * | 10/1990 | Newman | 370/410 |
| 5,150,360 | A | 9/1992 | Perlman et al. | |
| 6,032,194 | A | 2/2000 | Gai et al. | |
| 6,388,995 | B1 | 5/2002 | Gai et al. | |
| 6,400,681 | B1 | 6/2002 | Bertin et al. | |
| 6,535,491 | B2 | 3/2003 | Dutt et al. | |
| 6,697,339 | B1 | 2/2004 | Jain | |
| 6,882,630 | B1 | 4/2005 | Seaman | |
| 6,976,088 | B1 | 12/2005 | Gai et al. | |
| 7,428,658 | B2 | 9/2008 | Nagin et al. | |
| 7,457,322 | B1 * | 11/2008 | Flood et al. | 370/503 |
| 2001/0056503 | A1 | 12/2001 | Hibbard | |
| 2002/0181503 | A1 | 12/2002 | Montgomery, Jr. | |
| 2003/0123389 | A1 * | 7/2003 | Russell et al. | 370/230 |
| 2003/0218986 | A1 * | 11/2003 | DeSanti et al. | 370/250 |
| 2005/0265260 | A1 * | 12/2005 | Zinin et al. | 370/255 |
| 2007/0207591 | A1 | 9/2007 | Rahman et al. | |
| 2008/0072000 | A1 * | 3/2008 | Osaki et al. | 711/162 |
| 2009/0141700 | A1 * | 6/2009 | Baldemair et al. | 370/350 |

OTHER PUBLICATIONS

U.S. Appl. No. 11/559,845, filed Nov. 14, 2006.
US Office Action dated Feb. 9, 2009 issued in U.S. Appl. No. 11/559,845.
US Office Action dated Aug. 21, 2009 issued in U.S. Appl. No. 11/559,845.
Author Unknown, NCTIS Working Draft, ANSI, Fibre Channel Switch Fabric No. 3, Revision 6.3, Feb. 19, 2003.

* cited by examiner

*Primary Examiner*—Chi H. Pham
*Assistant Examiner*—Shick Hom
(74) *Attorney, Agent, or Firm*—Weaver Austin Villeneuve & Sampson LLP (57) ABSTRACT

In one embodiment, detecting an initialization of a synchronization phase of a network device in a fiber channel fabric, performing synchronization phase optimization of the network device to select a predetermined number of interfaces, and transmitting a synchronization request on the predetermined number of interfaces, are provided.

20 Claims, 6 Drawing Sheets

SELECTIVE BUILD FABRIC (BF) AND RECONFIGURE FABRIC (RCF) FLOODING

TECHNICAL FIELD

The present disclosure relates generally to providing selective build fabric (BF) and reconfigure fabric (RCF) frame flooding in a data network.

BACKGROUND

A fiber channel fabric typically uses a set of interconnected host bus adapters ((HBAs) which connects a host in/out bus to a computer terminal's memory), bridges, storage devices and switches. A storage area network (SAN) installation may include multiple fabrics for redundancy. Typically, a fabric may be considered as a set of switches sharing inter-switch links (ISLs) together with the devices to which they are connected. A SAN with multiple switches not connected by ISLs provide multiple fabrics.

Existing fiber channel fabrics have scalability limitations with the continued increase in the support of ports and virtual SANs (VSANs) on each switch. Indeed, when the principal link on a switch fails, there is a flood to fabric (Build-fabric) reconfiguration phase on all ports, all VSANs and all switches in the fabric. In turn, this leads to increase in the system load and may potentially result in control frame drops, instability, or large re-convergence times for the fabric on each VSAN.

More particularly, in a fibre-channel fabric, when a switch starts a build fabric (BF) phase, it will flood the network with BF frames by sending a BF_REQ frame through each interface and, for each interface, the switch will wait for a corresponding BF_RESP response frame. In a similar manner, when a switch starts a reconfigure fabric (RCF) phase, it will flood the network with RCF frames by sending a reconfigure request frame (RCF_REQ frame) through each connected interface, and also, for each interface, it will wait for a corresponding reconfigure response frame (RCF_RESP frame).

SUMMARY

Overview

A method in particular embodiments may include detecting an initialization of a synchronization phase of a network device in a fiber channel fabric, performing synchronization phase optimization of the network device to select a predetermined number of interfaces, and transmitting a synchronization request on the predetermined number of interfaces.

A method in particular embodiments may include detecting an initialization of a synchronization phase of a network device in a fiber channel fabric, the synchronization phase including one of a build fabric phase or a reconfigure fabric phase, performing synchronization phase optimization of the network device to select a predetermined number of interfaces, transmitting a synchronization request on the predetermined number of interfaces, and receiving a synchronization acknowledgement on the predetermined number of interfaces.

An apparatus in particular embodiments may include a network interface, one or more processors coupled to the network interface, and a memory for storing instructions which, when executed by the one or more processors, causes the one or more processors to detect an initialization of a synchronization phase of a network device in a fiber channel fabric, perform synchronization phase optimization of the network device to select a predetermined number of interfaces of the network interface, and transmit a synchronization request on the predetermined number of interfaces.

An apparatus in particular embodiments includes means for detecting an initialization of a synchronization phase of a network device in a fiber channel fabric, means for performing synchronization phase optimization of the network device to select a predetermined number of interfaces, and means for transmitting a synchronization request on the predetermined number of interfaces.

These and other features and advantages of the present disclosure will be understood upon consideration of the following description of the particular embodiments and the accompanying drawings.

DETAILED DESCRIPTION

Figure 1:
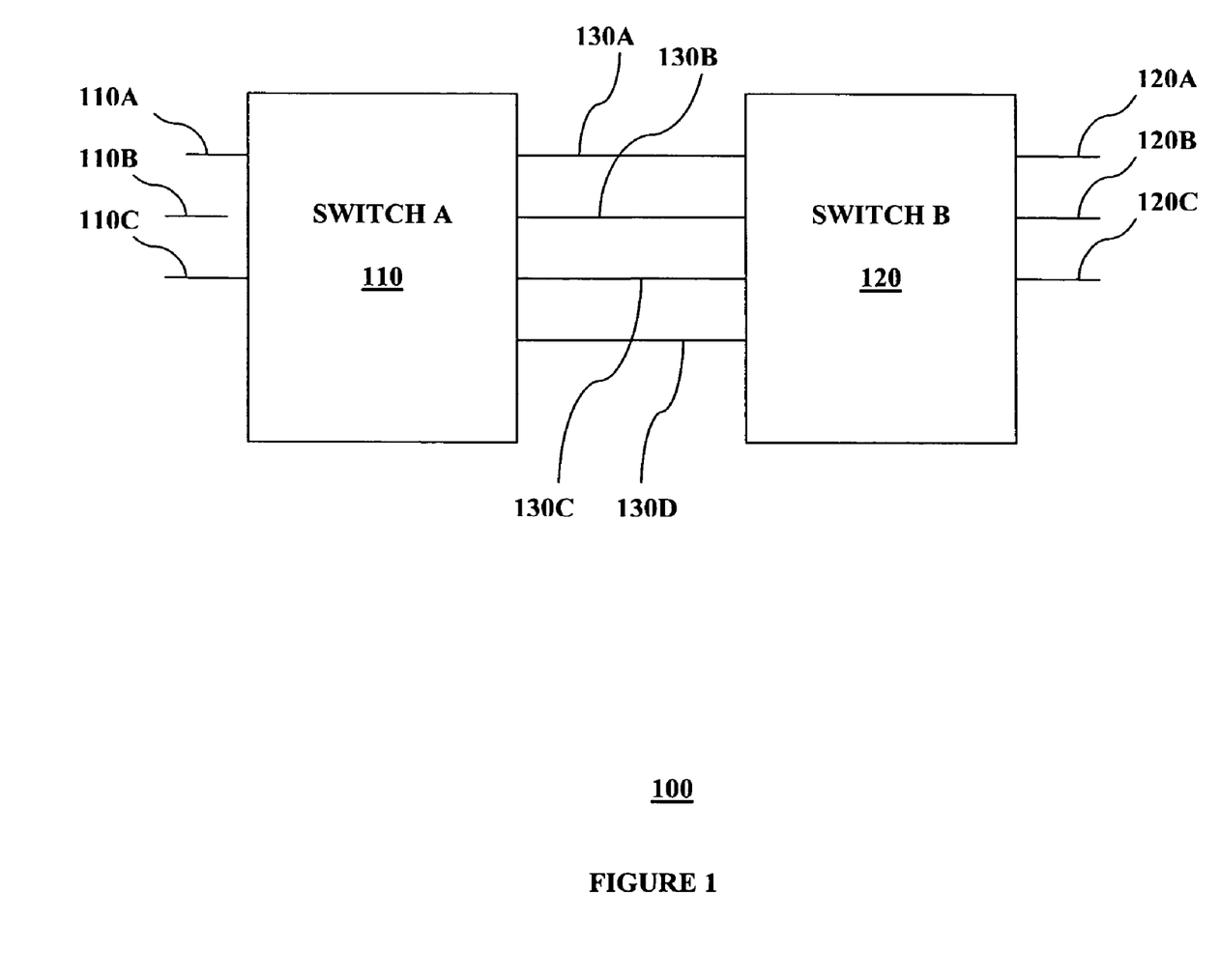
FIG. 1 is an example system for selective BF or RCF flooding in a data network.

FIG. 1 is an example system for selective BF or RCF flooding in a data network. Referring to FIG. 1, there is provided a first switch 110 configured to couple to a second switch 120 by a plurality of communication links 130A, 130B, 130C, 130D. Referring to FIG. 1, in one embodiment, first switch 110 may further include communication links 110A, 110B, 110C, each of which may be configured to operatively couple to one or more other network devices in the fiber channel fabric. Similarly, in one aspect, second switch 120 may further include communication links 120A, 120B, 120C each of which may be configured to operatively couple to one or more other network devices in the fiber channel fabric. Referring again to FIG. 1, while two switches 110, 120 are shown, within the scope of the present disclosure, additional switches and/or network devices may be provided within the fiber channel fabric. Moreover, in particular embodiments, the first switch 110 may be configured to include a predetermined number of interfaces operatively coupling to the second switch 120. For example, each switch in a fiber channel fabric may include, for example, but not limited to 100 physical links, to connect to multiple switches in the fibre channel fabric.

Referring again to FIG. 1, in one embodiment, each switch 110, 120 may be configured to obtain peer-identity information for every port and store the obtained peer identity information (for example, in a tabular form within a memory device (not shown) of the switches 110, 120). In one aspect, the peer identity information is configured to uniquely identify the associated switch, and may include, for example, a world wide name (WWN), a MAC address, and the like. In one aspect, the peer identify information such as the peer-WWN may be obtained using, for example, exchange link parameter (ELP) frame exchange, or a domain identifier assigned (DIA) exchange.

For example, in a fiber channel, device addressing may be handled in one of several ways. The first approach uses the worldwide name (WWN) of the device which is a 64-bit address that uniquely identifies each device globally to ensure that no duplicate WWNs are in the fiber channel network. Referring back to FIG. 1, in particular embodiments, using one or more mechanisms described above, switch 110 may be configured to identify or determine the unique peer-identity information of the switch 120, and similarly, the switch 120 may be configured to identify or determine the unique peer-identity information of the switch 110, such that every port on the switches 110, 120 is configured to obtain the information associated with the other switch peer-identity information.

In particular embodiments, during the BF or RCF synchronization phase of the switches in the fiber channel fabric, bandwidth and/or processing load optimization may be provided by, for example, performing a principal link only flooding, or alternatively performing a peer-aware flooding, as discussed in further detail below. More specifically, when the BF or RCF phase is initiated either automatically (for example, when a principal link goes down), or manually (for example, performed by a network administrator to apply one or more configuration parameters), the BF_REQ frames may be configured to send (and also to receive a corresponding BF_RESP frames) on the principal links only, or alternatively, a single BF_REQ frame may be sent to each peer switch (and a corresponding BF_RESP frame received) even if the peer switches are reachable via additional links or interfaces.

After successful BF or RCF synchronization phase, the principal switch selection may be performed as well as domain ID distribution in the fibre channel fabric.

Referring again to FIG. 1, in particular embodiments, as discussed in further detail below, by selectively flooding the fibre channel fabric during the BF or RCF phase so that a limited number of phase request frames are sent (and phase response phase received), the BF or RCF synchronization phase may be effectively performed while minimizing the processing load and/or network bandwidth, as compared to when all interfaces in the fiber channel fabric are provided with BF_REQ frames and thereafter receiving a corresponding BF_RESP frames (or similarly, a RCF_REQ frame and a corresponding RCF_RESP frame).

Figure 2:
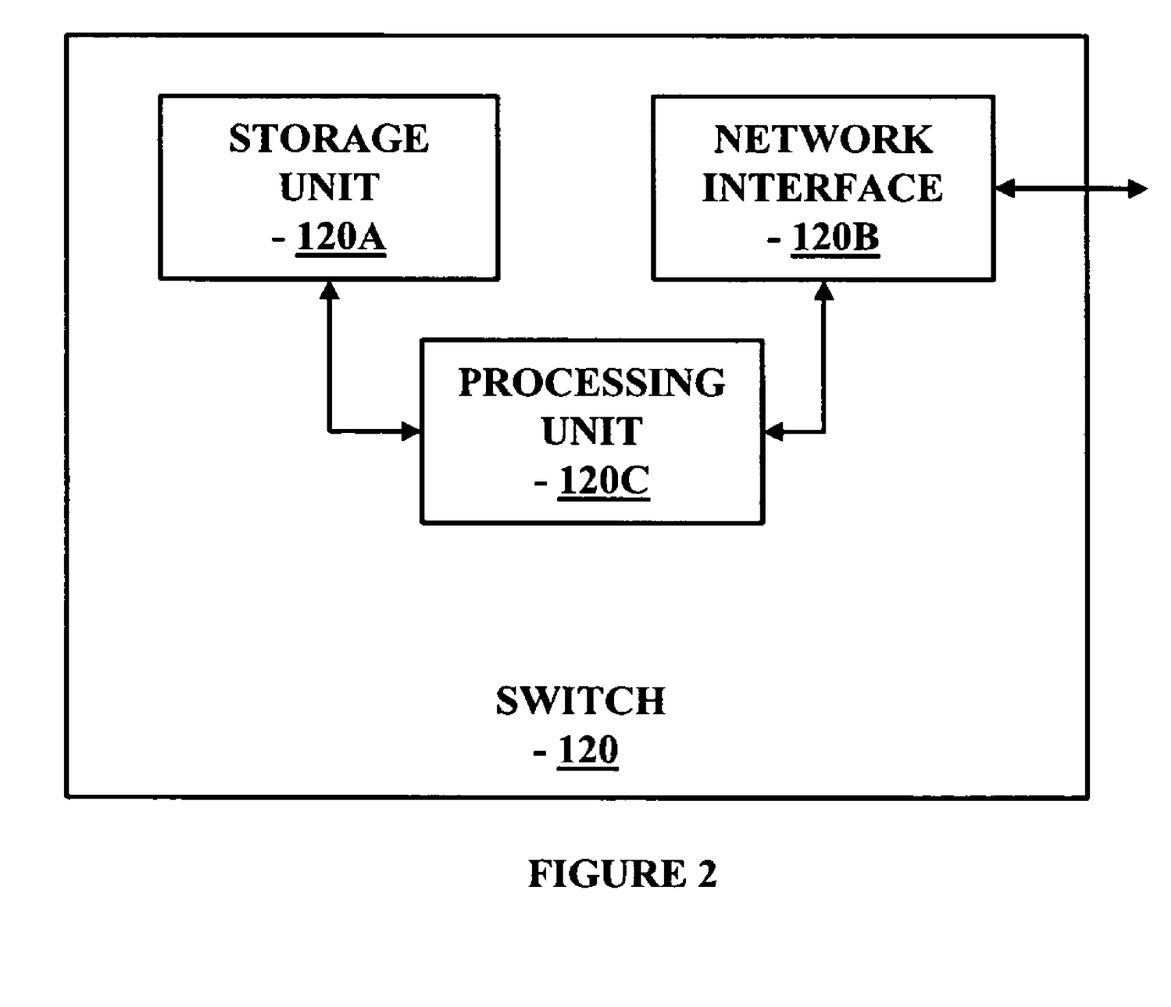
FIG. 2 illustrates an example network device in the system illustrated in FIG. 1.

FIG. 2 illustrates an example switch in the system illustrated in FIG. 1. Referring to FIG. 1, the switch 120 in particular embodiments includes a storage unit 120A operatively coupled to a processing unit 120C. In particular embodiments, the processing unit 120C may include one or more microprocessors for retrieving and/or storing data from the storage unit 120A, and further, for executing instructions stored in, for example, the storage unit 120A, for implementing one or more associated functions related to graceful failover of a communication link in a network. Referring again to FIG. 1, in one aspect, the switch 120 may include a network interface 120B which may be configured to interface with for example, the switch 110, or network devices in the network.

In particular embodiments, as discussed in further detail below, the memory or storage unit 120A of the switch 120 may be configured to store instructions which may be executed by the processing unit 120C to detect an initialization of a synchronization phase of a network device in a fiber channel fabric, perform synchronization phase optimization of the network device to select a predetermined number of interfaces, and transmit a synchronization request on the predetermined number of interfaces.

Figure 3:
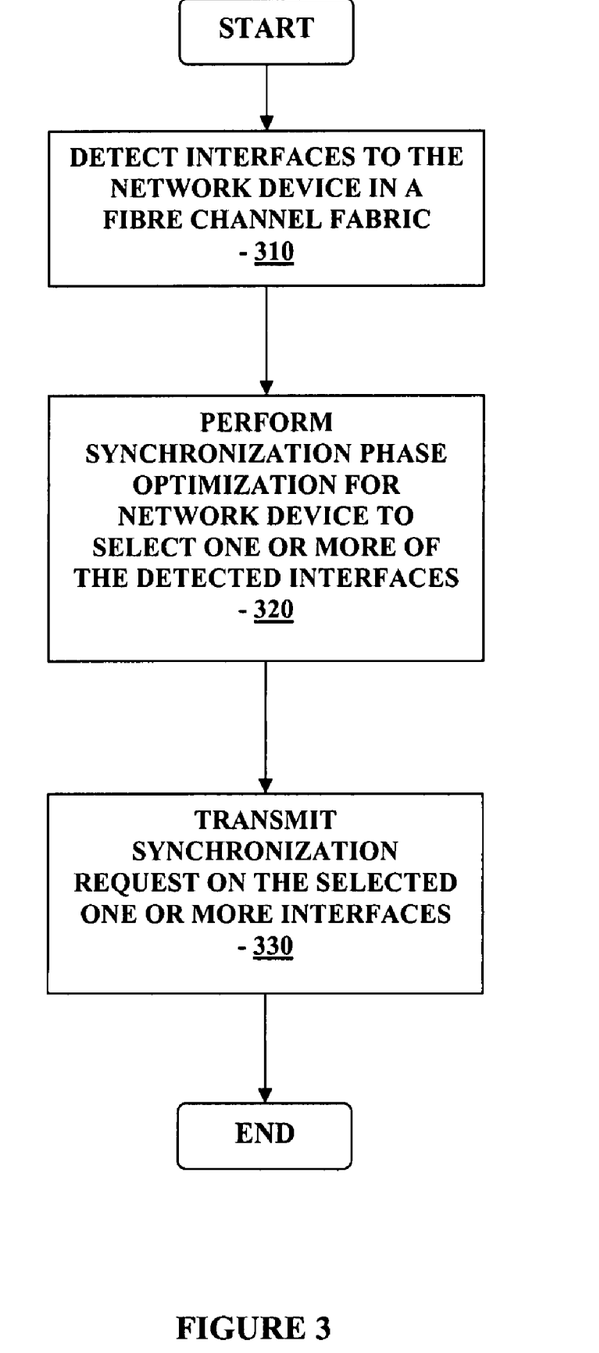
FIG. 3 illustrates an example method for providing selective synchronization phase flooding in a network.

FIG. 3 illustrates an example method for providing selective synchronization phase flooding in a network. Referring to FIG. 3, in particular embodiments, interfaces to the network device such as the switch 110 (or switch 120) of FIG. 1 are detected in the fibre channel fabric at step 310. Thereafter, a synchronization phase optimization for the network device is performed to select for use in the synchronization one or more of the detected interfaces. For example, in particular embodiments, the selected one or more of the detected interfaces includes a subset of all detected interfaces for the network device.

Referring again to FIG. 3, after the synchronization phase optimization is performed, the synchronization request is transmitted on the selected one or more interfaces at step 330. That is, in particular embodiments, using a predetermined approach to selectively flood the fiber channel fabric during the synchronization phase (for example, the build fabric (BF) or the reconfigure fabric (RCF) phase), the associated synchronization frames (and corresponding acknowledgement frames) are send (and received) on a subset or selected number of interfaces to the network device. In this manner, in particular embodiments, the processing load of the network device may be optimized, and also, the network bandwidth may be optimized by, for example, reducing the number of synchronization phase request and acknowledgement frames, while insuring that all devices in the fiber channel fabric receive at least one synchronization phase request (and correspondingly transmit the acknowledgement frames).

Figure 4:
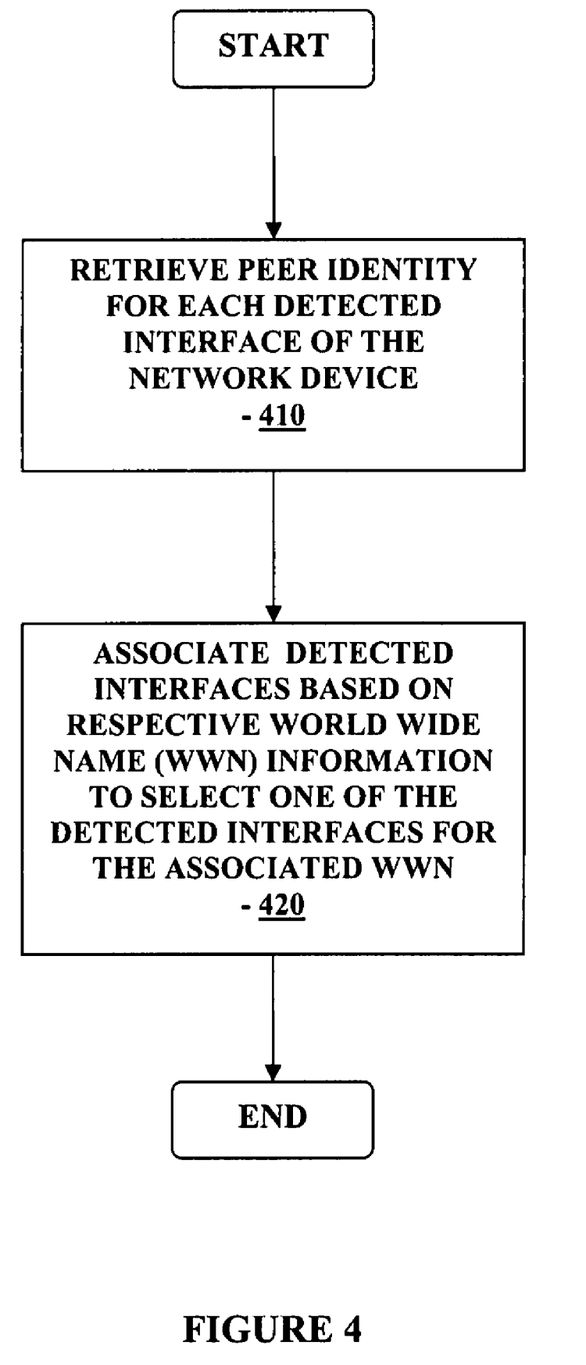
FIG. 4 illustrates an example method for providing synchronization phase optimization of FIG. 3 in a network.

FIG. 4 illustrates an example method for providing synchronization phase optimization of FIG. 3 in a network. Referring to FIG. 4, in particular embodiments, at step 410, the peer identify information for each detected interface (or port) of the network device is retrieved during, for example, the synchronization phase optimization (step 320, FIG. 3). Thereafter, at step 420 the detected interfaces for the network switch are associated or grouped based on a predetermined association or group parameter, for example, based on world wide name (WWN). It is to be noted that in particular embodiments, the detected interfaces associated with a predetermined WWN includes a subset of the total number of interfaces of the network device.

Referring back to FIGS. 3 and 4, after determining the associated detected interfaces at step 420, the synchronization request frame (step 320, FIG. 3) may be sent on the associated detected interfaces (step 420), and further, using the same associated detected interfaces, the corresponding response or acknowledgement frames to the synchronization request frames are received.

Figure 5:
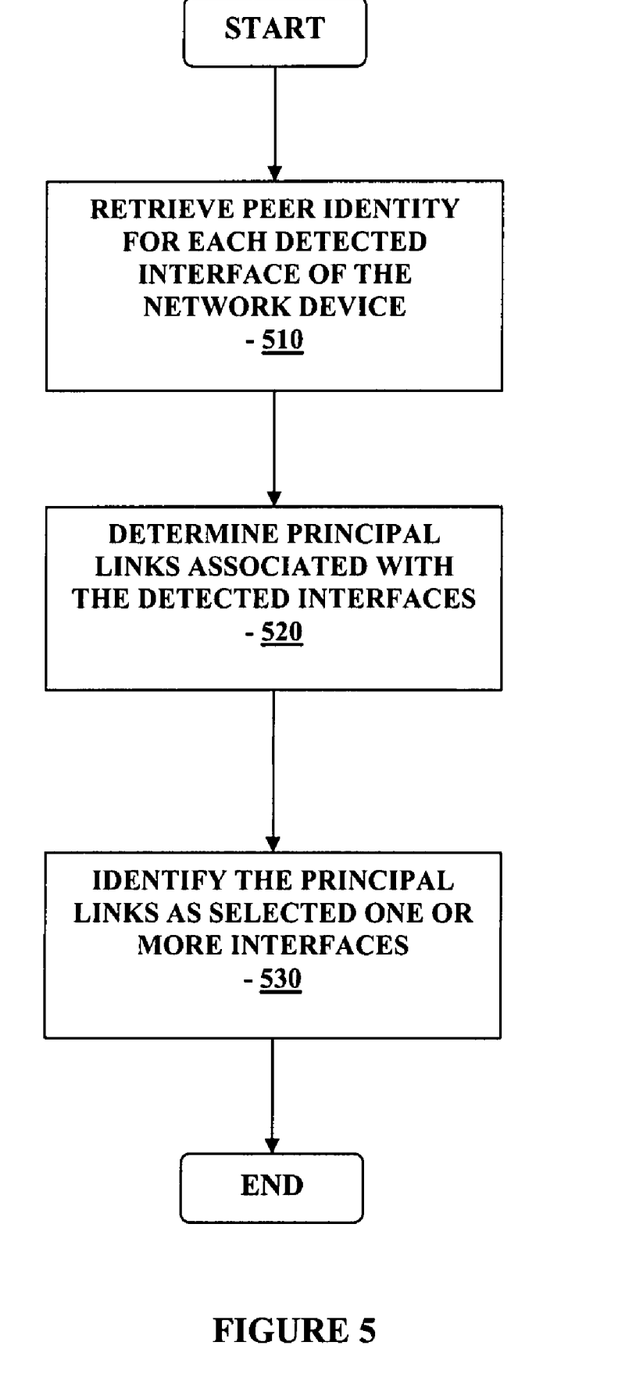
FIG. 5 illustrates an example method for providing synchronization phase optimization of FIG. 3 in a network.

FIG. 5 illustrates an example method for providing synchronization phase optimization of FIG. 3 in a network. Referring to FIG. 5, in particular embodiments, during the synchronization phase optimization (step 320, FIG. 3), for example, the peer identify information for each detected interface of the network device is retrieved at step 510. Thereafter, it is determined at step 520 whether there are principal links associated with the detected interfaces. Based on the principal link determination, at step 530, principal links for the selected one or more interfaces (for the synchronization phase optimization), are identified.

In this manner, in particular embodiments, the synchronization phase optimization including, for example, build fabric (BF) or reconfigure fabric (RCF) phase in a fiber channel fabric may be performed, for example, but not limited to a subset of network device or switch interfaces that are associated with a predetermined world wide name (WWN) for example, or that are principal links. While there are other approaches for the synchronization phase optimization in determining a subset of interfaces to transmit BF or RCF request frames (and to receive a corresponding BF or RCF acknowledgement frames), in particular embodiments, two approaches are described herein. More specifically, in particular embodiments, one approach may be configured to send the synchronization frames only via the principal links, while another approach may be configured to send the synchronization frames based on a predetermined or randomly selected link from a number of links that have the same peer-WWN.

Figure 6:
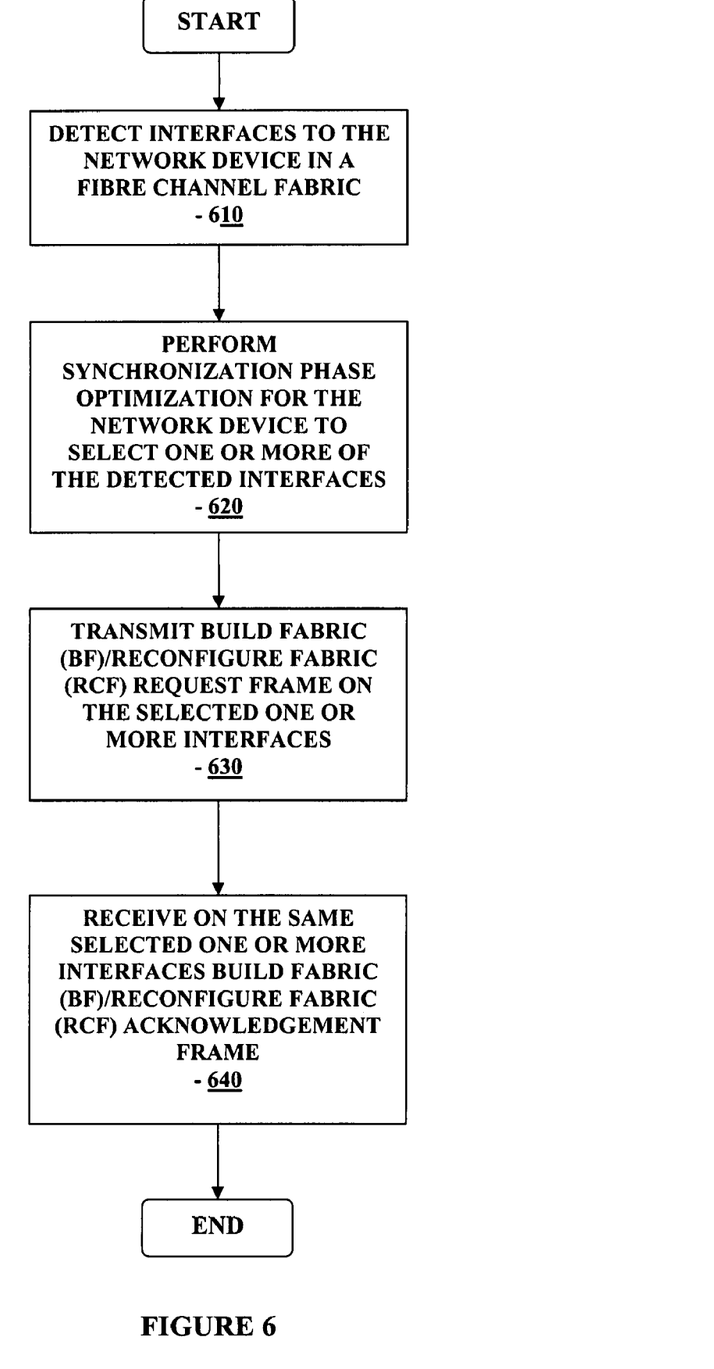
FIG. 6 illustrates an example method for providing selective build fabric (BF) or reconfigure fabric (RCF) phase flooding in a network.

FIG. 6 illustrates an example method for providing selective build fabric (BF) or reconfigure fabric (RCF) phase flooding in a network. Referring to FIG. 6, in particular embodiments, at step 610, interfaces to the network device in a fiber channel fabric are identified. Thereafter, synchronization phase optimization is performed for the network device to select one or more of the detected interfaces at step 620. In particular, during the synchronization phase optimization, a subset of interfaces such as those identified as principal links, or alternatively, the interfaces that are associated with a predetermined parameter such as WWN, are identified for use during the selective flooding process.

Referring back to FIG. 6, at step 630, BF or RCF request frame is transmitted on the one or more selected interfaces, and thereafter, at step 640, a corresponding BF or RCF acknowledgement frame is received on the same one or more selected interfaces.

In this manner, in one aspect of the present disclosure, since a switch in a fibre channel fabric need only receive one single BF and RCF frame in order to enter the corresponding phase, the amount of bandwidth used by a fabric to propagate the BF and/or RCF frames to all switches in the network may be optimized by, for example, pruning redundant frames. More particularly, in accordance with one aspect of the present disclosure, optimization techniques for reducing redundant BF request (BF_REQ) or RCF request (RCF_REQ) frames sent by a switch in a fibre-channel fabric when the corresponding BF phase or the RCF phase are started, including, for example, selective flooding in the fibre-channel fabric during the BF or the RCF phase. In particular, in one aspect of the present disclosure, the selective flooding during the BF or the RCF phase may include configuring each switch in the fabric to send the BF or RCF request frames through a subset of its respective available interfaces, while insuring that all switches in the fabric receive at least one request frame.

Accordingly, in particular embodiments, the bandwidth and the processing load may be reduced in particular, when trunked ports are used to carry multiple VSANs. In this manner, a simple, efficient approach to optimizing bandwidth and processing load associated with BF or RCF phases in a fibre-channel fabric are provided, and which does not require new or additional frame or messaging.

A method in particular embodiments include detecting an initialization of a synchronization phase of a network device in a fiber channel fabric, performing synchronization phase optimization of the network device to select a predetermined number of interface, and transmitting a synchronization request on the predetermined number of interfaces.

The synchronization phase may include one of a build fabric phase or a reconfigure fabric phase.

Each of the predetermined number of interfaces of the network device may be a principal link.

In a further embodiment, each of the predetermined number of interfaces of the network device may be associated with a predetermined parameter, where the predetermined parameter may include a world wide name (WWN).

The method in particular embodiments may include receiving a synchronization acknowledgement on the predetermined number of interfaces.

Also, the predetermined number of interfaces may be a subset of the total number of interfaces of the network device in the fibre channel fabric.

A method in particular embodiments may include detecting an initialization of a synchronization phase of a network device in a fiber channel fabric, the synchronization phase including one of a build fabric phase or a reconfigure fabric phase, performing synchronization phase optimization of the network device to select a predetermined number of interfaces, transmitting a synchronization request on the predetermined number of interfaces, and receiving a synchronization acknowledgement on the predetermined number of interfaces.

An apparatus in particular embodiments may include a network interface, one or more processors coupled to the network interface, a memory for storing instructions which, when executed by the one or more processors, causes the one or more processors to detect an initialization of a synchronization phase of a network device in a fiber channel fabric, perform synchronization phase optimization of the network device to select a predetermined number of interfaces of the network interface, and transmit a synchronization request on the predetermined number of interfaces.

Further, each of the predetermined number of interfaces of the network device may be a principal link. Alternatively, each of the predetermined number of interfaces of the network interface may be associated with a predetermined parameter, where the predetermined parameter may include a world wide name (WWN).

The memory for storing instructions which, when executed by the one or more processors, may cause the one or more processors to receive a synchronization acknowledgement on the predetermined number of interfaces.

The predetermined number of interfaces may be a subset of the total number of interfaces of the network device in the fibre channel fabric.

An apparatus in particular embodiments may include means for detecting an initialization of a synchronization phase of a network device in a fiber channel fabric, means for performing synchronization phase optimization of the network device to select a predetermined number of interfaces, and means for transmitting a synchronization request on the predetermined number of interfaces.

The various processes described above including the processes performed by the switch 110 or switch 120 in the software application execution environment in the example system 100 including the processes and routines described in conjunction with FIGS. 3-6, may be embodied as computer programs developed using an object oriented language that allows the modeling of complex systems with modular objects to create abstractions that are representative of real world, physical objects and their interrelationships. The software required to carry out the inventive process, which may be stored in the memory or storage unit 120A of the switch 120 (or similar storage unit of the switch 110) may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
   detecting an initialization of a synchronization phase of a network device in a fiber channel fabric;
   performing synchronization phase optimization of the network device to select a predetermined number of interfaces of the network device, wherein selection of each predetermined number of interfaces is based on whether each interface is a principal link or has a world wide name (WWN) that belongs to a predetermined WWN grouping; and
   transmitting a synchronization request on the predetermined number of interfaces of the network device so as to selectively flood such synchronization request only to the predetermined number of interfaces.

2. The method of claim 1, wherein the synchronization phase includes one of a build fabric (BF) phase or a reconfigure fabric (RCF) phase and the synchronization request is a BF or RCF frame that is selectively flooded to the predetermined number of interfaces.

3. The method of claim 1, wherein selection of each of the predetermined number of interfaces of the network device is based on whether each interface is a principal link.

4. The method of claim 1, wherein selection of each of the predetermined number of interfaces of the network device is based on whether each interface has a WWN that belongs to the predetermined WWN grouping.

5. The method of claim 4, wherein the WWN grouping is a peer-WWN grouping.

6. The method of claim 1, further including receiving a synchronization acknowledgement on the predetermined number of interfaces.

7. The method of claim 1, wherein the predetermined number of interfaces is a subset of the total number of interfaces of the network device in the fibre channel fabric.

8. A method, comprising:
   detecting an initialization of a synchronization phase of a network device in a fiber channel fabric, the synchronization phase including one of a build fabric phase or a reconfigure fabric phase;
   performing synchronization phase optimization of the network device to select a predetermined number of interfaces of the network device, wherein selection of each predetermined number of interfaces is based on whether each interface is a principal link or has a world wide name (WWN) that belongs to a predetermined WWN grouping;
   transmitting a synchronization request on the predetermined number of interfaces so as to selectively flood such synchronization request only to the predetermined number of interfaces; and
   receiving a synchronization acknowledgement on the predetermined number of interfaces.

9. The method of claim 8, wherein selection of each of the predetermined number of interfaces of the network device is based on whether each interface is a principal link.

10. The method of claim 8 wherein selection of each of the predetermined number of interfaces of the network device is based on whether each interface has a WWN that belongs to the predetermined WWN grouping parameter.

11. The method of claim 10, wherein the WWN grouping is a peer-WWN grouping.

12. The method of claim 8, wherein the predetermined number of interfaces is a subset of the total number of interfaces of the network device in the fibre channel fabric.

13. An apparatus, comprising:
   a network interface;
   one or more processors coupled to the network interface; and
   a memory for storing instructions which, when executed by the one or more processors, causes the one or more processors to detect an initialization of a synchronization phase of a network device in a fiber channel fabric, perform synchronization phase optimization of the network device to select a predetermined number of interfaces of the network interface, and transmit a synchronization request on the predetermined number of interfaces so as to selectively flood such synchronization request only to the predetermined number of interfaces, wherein selection of each predetermined number of interfaces is based on whether each interface is a principal link or has a world wide name (WWN) that belongs to a predetermined WWN grouping.

14. The apparatus of claim 13, wherein the synchronization phase includes one of a build fabric (BF) phase or a reconfigure fabric (RCF) phase and the synchronization request is a BF or RCF frame that is selectively flooded to the predetermined number of interfaces.

15. The apparatus of claim 13, wherein selection of each of the predetermined number of interfaces of the network device is based on whether each interface is a principal link.

16. The apparatus of claim 13, wherein selection of each of the predetermined number of interfaces of the network device is based on whether each interface has a WWN that belongs to the predetermined WWN grouping.

17. The apparatus of claim 16, wherein the WWN grouping is a peer-WWN grouping.

18. The apparatus of claim 13, wherein the memory for storing instructions which, when executed by the one or more processors, causes the one or more processors to receive a synchronization acknowledgement on the predetermined number of interfaces.

19. The apparatus of claim 13, wherein the predetermined number of interfaces is a subset of the total number of interfaces of the network device in the fibre channel fabric.

20. A computer program product comprising at least one non-transitory computer-readable medium having computer program instruction stored therein which are configured for:
   detecting an initialization of a synchronization phase of a network device in fiber channel fabric;
   performing synchronization phase optimization of the network device to select a predetermined number of interfaces of the network device, wherein selection of each predetermined number of interfaces is based on whether each interface is a principal link or has a world wide name (WWN) that belongs to a predetermined WWN grouping; and
   transmitting a synchronization request on the predetermined number of interfaces so as to selectively flood such synchronization request only to the predetermined number of interfaces.

* * * * *